United States Patent
Jiang et al.

(10) Patent No.: US 8,565,285 B2
(45) Date of Patent: Oct. 22, 2013

(54) FREQUENCY HOPPING METHOD AND BASE STATION FOR DOWNLINK DEDICATED PILOT FREQUENCY

(75) Inventors: Jing Jiang, Shenzhen (CN); Shuqiang Xia, Shenzhen (CN); Hui Yu, Shenzhen (CN); Feng Bi, Shenzhen (CN); Yunfeng Sun, Shenzhen (CN); Changqing Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 411 days.

(21) Appl. No.: 12/737,054

(22) PCT Filed: Dec. 19, 2008

(86) PCT No.: PCT/CN2008/073619
§ 371 (c)(1),
(2), (4) Date: Dec. 3, 2010

(87) PCT Pub. No.: WO2009/152675
PCT Pub. Date: Dec. 23, 2009

(65) Prior Publication Data
US 2011/0075703 A1 Mar. 31, 2011

(30) Foreign Application Priority Data
Jun. 16, 2008 (CN) .......................... 2008 1 0100470

(51) Int. Cl.
*H04B 1/00* (2006.01)

(52) U.S. Cl.
USPC ........... 375/132; 375/130; 375/135; 375/267; 375/295; 375/316

(58) Field of Classification Search
USPC ......... 375/130, 132, 135, 136, 137, 145–147, 375/150, 219, 222, 259, 262, 267, 271, 295, 375/302, 316, 340, 346, 450
See application file for complete search history.

(56) References Cited

U.S. PATENT DOCUMENTS

| | | | | |
|---|---|---|---|---|
| 8,213,483 B2* | 7/2012 | Malladi | .......................... | 375/135 |
| 8,417,207 B2* | 4/2013 | Mesecher | ..................... | 455/296 |
| 8,432,862 B2* | 4/2013 | Park et al. | ..................... | 370/329 |
| 8,437,315 B2* | 5/2013 | Kostic et al. | .................. | 370/335 |
| 2007/0248147 A1* | 10/2007 | Tiirola et al. | ................. | 375/135 |
| 2008/0170602 A1* | 7/2008 | Guey | ............................ | 375/137 |
| 2008/0187027 A1* | 8/2008 | Malladi | .......................... | 375/135 |

(Continued)

FOREIGN PATENT DOCUMENTS

| CN | 1852069 A | 10/2006 |
|---|---|---|
| CN | 101112005 A | 1/2008 |
| CN | 101124795 A | 2/2008 |
| WO | WO 2006134949 A1 * | 12/2006 |

*Primary Examiner* — Hirdepal Singh
(74) *Attorney, Agent, or Firm* — Farjami & Farjami LLP

(57) ABSTRACT

A method for frequency hopping of a downlink dedicated pilot frequency, comprises: for the downlink dedicated pilot frequency, determining a frequency hopping offset corresponding to the downlink dedicated pilot frequency according to a cell identity of a cell to which it pertains (S202); determining a frequency domain position of the downlink dedicated pilot frequency in a physical resource block to which it belongs after a frequency hopping according to the frequency hopping offset and a relative frequency domain position of the downlink dedicated pilot frequency (S204); performing resource mapping for the downlink dedicated pilot frequency on the entire frequency domain according to the determined frequency domain position (S206). A base station is used to implement the frequency hopping of the downlink dedicated pilot frequency.

17 Claims, 2 Drawing Sheets

(56) References Cited

U.S. PATENT DOCUMENTS

| | | |
|---|---|---|
| 2008/0212462 A1* | 9/2008 | Ahn et al. ............... 370/209 |
| 2008/0225993 A1* | 9/2008 | Malladi et al. ........... 375/340 |
| 2009/0088124 A1* | 4/2009 | Schuur et al. ............ 455/341 |
| 2009/0191835 A1* | 7/2009 | Lozano et al. ........... 455/334 |
| 2009/0225721 A1* | 9/2009 | Cudak et al. ............ 370/330 |
| 2009/0225888 A1* | 9/2009 | Noh et al. ............... 375/267 |
| 2009/0296563 A1* | 12/2009 | Kishiyama et al. ...... 370/210 |
| 2010/0103906 A1* | 4/2010 | Montojo et al. ......... 370/335 |
| 2011/0149942 A1* | 6/2011 | Ko et al. ................. 370/343 |
| 2012/0281662 A1* | 11/2012 | Prasad et al. ............ 370/329 |

* cited by examiner

FREQUENCY HOPPING METHOD AND BASE STATION FOR DOWNLINK DEDICATED PILOT FREQUENCY

This is a U.S. national phase application which is based on, and claims priority from, PCT application Serial No. PCT/CN2008/073619, filed Dec. 19, 2008, which claims priority from foreign application Serial No. 200810100470.X, filed Jun. 16, 2008 in China.

TECHNICAL FIELD

The present invention relates to a Long Term Evolution (LTE) system and LTE Advanced system, and in particular, to a method and base station for frequency hopping of a downlink dedicated pilot frequency under a LTE/LTE Advanced extended cyclic prefix frame structure.

BACKGROUND OF THE RELATED ART

In the LTE system, a downlink dedicated pilot frequency is used as a phase reference for demodulating a physical downlink shared channel (PDSCH), and is configured semi-statically for a user terminal by a higher layer. The downlink dedicated pilot frequency is transmitted through the antenna port 5, and in current LTE versions, main application contexts include downlink reference signal formed by a beam, downlink reference signal pre-encoded specifically, and parallel load.

The pattern of the downlink dedicated pilot frequency in the extended cyclic prefix (Extended CP) frame structure is determined in 3GPP (3$^{rd}$ Generation Partnership Project) LTE 52bis conference and 53# conference, and is illustrated in the reference 3GPP R1-2159, which specifies:

Extended cyclic prefix:

$$a_{k,l}^{(p)} = r(4 \cdot l' \cdot N_{RB}^{PDSCH} + m') \quad \text{Formula 1}$$
$$k = (k') \bmod N_{SC}^{RB} + N_{SC}^{RB} \cdot n_{PRB}$$
$$k' = \begin{cases} 3m', & \text{if } l = 4 \\ 3m' + 2, & \text{if } l = 1 \end{cases}$$

$$l = \begin{cases} 4 & l' \in \{0, 2\} \\ 1 & l' = 1 \end{cases} \quad \text{Formula 2}$$
$$l' = \begin{cases} 0, & \text{if } n_s \bmod 2 = 0 \\ 1, 2, & \text{if } n_s \bmod 2 = 1 \end{cases}$$
$$m' = 0, 1, \ldots, 4N_{RB}^{PDSCH} - 1$$

Wherein, $a_{k,l}^{(p)}$ represents a downlink dedicated pilot frequency a, k is a frequency domain mapping position of the dedicated pilot frequency in a physical resource block (RB) allocated on the PDSCH, and l is a time domain mapping position of the dedicated pilot frequency in the RB allocated on the PDSCH; l' and m' are intermediate variables, $n_s$ is a time slot, $N_{RB}^{PDSCH}$ is the number of physical resource blocks allocated for the UE on the PDSCH, $N_{SC}^{RB}$ is the number of sub-carriers included in each minimal physical resource block, and $n_{PRB}$ is the serial number of a physical resource block allocated for the UE on the entire bandwidth of the PDSCH.

From the $$k = (k') \bmod N_{SC}^{RB} + N_{SC}^{RB} \cdot n_{PRB},$$

$$k' = \begin{cases} 3m', & \text{if } l = 4 \\ 3m' + 2, & \text{if } l = 1 \end{cases},$$

and $$m' = 0, 1, \ldots, 4N_{RB}^{PDSCH} - 1$$

in the above formulas, it can be seen that the frequency domain position of a downlink dedicated pilot frequency in a RB allocated on the PDSCH is relatively fixed, and if the beam directions of two adjacent cells are on the same line and positions of the dedicated pilot frequencies in the frequency domain are the same, comparatively large peak power will be generated for users at edges of the cells and the interference between UEs in different cells will be increased.

SUMMARY OF THE INVENTION

The technical problem to be solved by the present invention is to provide a method and base station for frequency hopping of a downlink dedicated pilot frequency, intended to decrease the interference between UEs using downlink dedicated pilot frequencies in different cells.

In order to solve the above problem, the present invention provides a method for frequency hopping of a downlink dedicated pilot frequency, comprising:

for the downlink dedicated pilot frequency, determining a frequency hopping offset corresponding to the downlink dedicated pilot frequency according to a cell identity of a cell to which the downlink dedicated pilot frequency pertains;

determining a frequency domain position of the downlink dedicated pilot frequency in a physical resource block to which the downlink dedicated pilot frequency belongs after a frequency hopping according to the frequency hopping offset and a relative frequency domain position of the downlink dedicated pilot frequency;

performing resource mapping for the downlink dedicated pilot frequency on the entire frequency domain according to the determined frequency domain position.

Furthermore, the above method may have the following features: if a sum of the relative frequency domain position of the downlink dedicated pilot frequency in the physical resource block and the frequency hopping offset of the downlink dedicated pilot frequency is greater than the number of sub-carriers included in the physical resource block, the frequency domain position of the downlink dedicated pilot frequency in the physical resource block to which the downlink dedicated pilot frequency belongs after a frequency hopping is a frequency domain position obtained by the sum of the relative frequency domain position and the frequency hopping offset of the downlink dedicated pilot frequency modulo the number of sub-carriers included in the physical resource block.

Furthermore, the above method may have the following features: a position of the downlink dedicated pilot frequency mapped onto the entire frequency domain is $k=(k'+v_{shift}) \bmod N_{SC}^{RB} + N_{SC}^{RB} \cdot n_{PRB}$ wherein, $(k'+v_{shift}) \bmod N_{SC}^{RB}$ is the frequency domain position of the downlink dedicated pilot frequency in the physical resource block to which the downlink dedicated pilot frequency belongs after a frequency hopping, $n_{PRB}$ is a serial number of the physical resource block allocated for a terminal on the entire frequency domain of a physical downlink shared channel, and $N_{SC}^{RB}$ is the number of sub-carriers included in each minimal physical resource block.

Furthermore, the above method may have the following features: the frequency hopping offset corresponding to the downlink dedicated pilot frequency determined according to the cell identity to which the downlink dedicated pilot frequency pertains is a frequency hopping offset $v_{shift}$ of the downlink dedicated pilot frequency, and $v_{shift}=N_{ID}^{cell} \bmod 3$, wherein, $N_{ID}^{cell}$ represents the cell identity.

Furthermore, the above method may have the following features: the frequency hopping offset of the downlink dedicated pilot frequency is $v_{shift}=(N_{ID}^{cell}+2) \bmod 3$, wherein, $N_{ID}^{cell}$ represents the cell identity.

Furthermore, the above method may have the following features: the frequency hopping offset of the downlink dedicated pilot frequency is $v_{shift}=N_{ID}^{cell} \bmod 6$, wherein, $N_{ID}^{cell}$ represents the cell identity.

Furthermore, the above method may have the following features: the frequency hopping offset of the downlink dedicated pilot frequency is $v_{shift}=(N_{ID}^{cell}+2) \bmod 6$, wherein, $N_{ID}^{cell}$ represents the cell identity.

The present invention further provides a base station for implementing frequency hopping of a downlink dedicated pilot frequency, comprising:

a pilot frequency offset configuration unit, configured to determine a frequency hopping offset corresponding to the downlink dedicated pilot frequency according to a cell identity of a cell to which the downlink dedicated pilot frequency pertains;

a frequency hopping unit, configured to determine a frequency domain position of the downlink dedicated pilot frequency in a physical resource block to which the downlink dedicated pilot frequency belongs after a frequency hopping according to the frequency hopping offset and a relative frequency domain position of the downlink dedicated pilot frequency;

a mapping unit, configured to perform resource mapping for the downlink dedicated pilot frequency on the entire frequency domain according to the determined frequency domain position.

Furthermore, the above base station may have the following features: when the frequency hopping unit determines the frequency domain position of the downlink dedicated pilot frequency in the physical resource block to which the downlink dedicated pilot frequency belongs after a frequency hopping, if a sum of the relative frequency domain position of the downlink dedicated pilot frequency in the physical resource block and the frequency hopping offset of the downlink dedicated pilot frequency is greater than the number of sub-carriers included in the physical resource block, the frequency domain position of the downlink dedicated pilot frequency in the physical resource block to which the downlink dedicated pilot frequency belongs after a frequency hopping is a frequency domain position obtained by the sum of the relative frequency domain position and the frequency hopping offset of the downlink dedicated pilot frequency modulo the number of sub-carriers included in the physical resource block.

Furthermore, the above base station may have the following features: a position of the downlink dedicated pilot frequency mapped onto the entire frequency domain by the mapping unit is $k=(k'+v_{shift}) \bmod N_{SC}^{RB}+N_{SC}^{RB} \cdot n_{PRB}$, wherein, $(k'+v_{shift}) \bmod N_{SC}^{RB}$ is the frequency domain position of the downlink dedicated pilot frequency in the physical resource block to which the downlink dedicated pilot frequency belongs after a frequency hopping, $n_{PRB}$ is a serial number of the physical resource block allocated for a terminal on the entire frequency domain of a physical downlink shared channel, and $N_{SC}^{RB}$ is the number of sub-carriers included in each minimal physical resource block.

Furthermore, the above base station may have the following features: the frequency hopping offset of the downlink dedicated pilot frequency determined by the pilot frequency offset configuration unit is $v_{shift}=N_{ID}^{cell} \bmod 3$, or $(N_{ID}^{cell}+2) \bmod 3$, or $N_{ID}^{cell} \bmod 6$, or $(N_{ID}^{cell}+2) \bmod 6$, wherein, $N_{ID}^{cell}$ represents the cell identity.

Compared with the prior art, the present invention has the following advantages:

(1) It can decrease the interference between dedicated pilot frequencies of adjacent cells; (2) it improves the channel estimation performance of the dedicated pilot frequency; (3) it facilitates unification of the coverage of control channel and data channel.

PREFERRED EMBODIMENTS OF THE INVENTION

Figure 1:
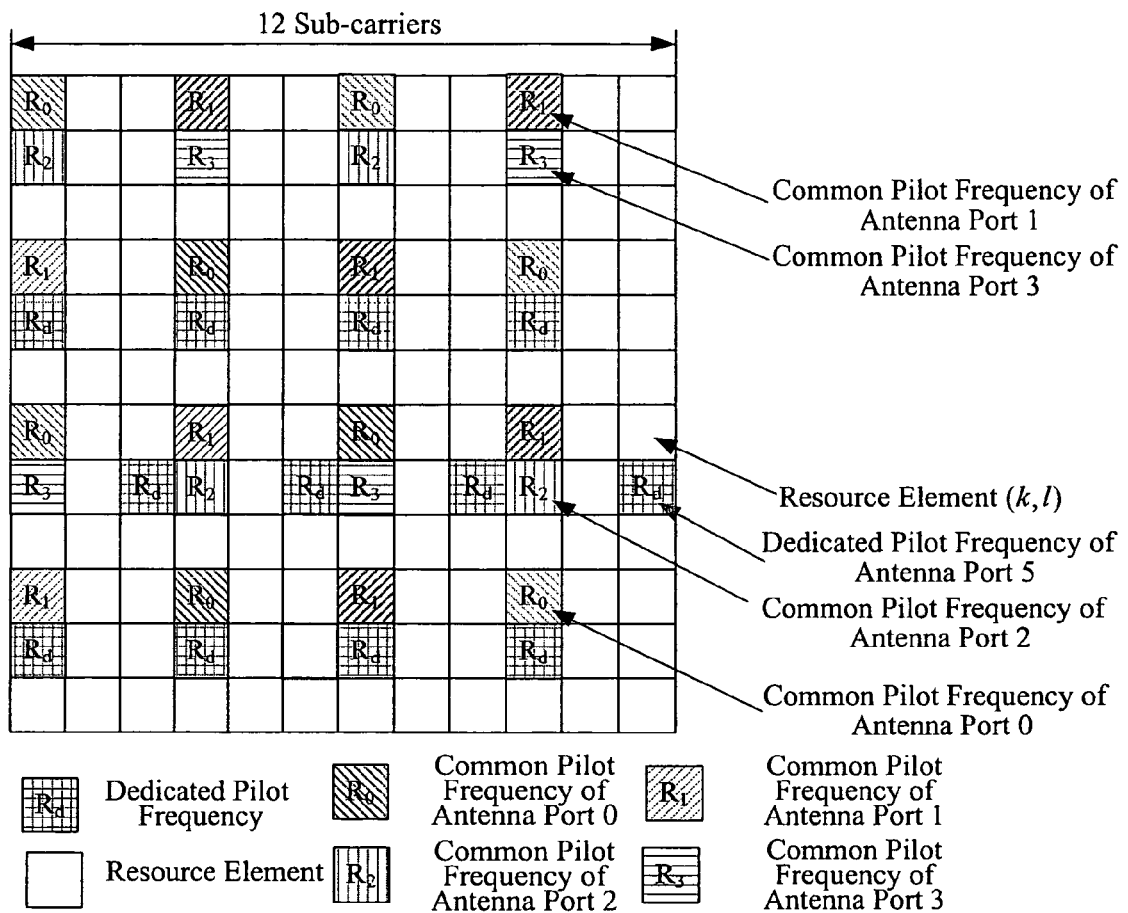
FIG. 1 illustrates the mapping pattern of a downlink dedicated pilot frequency as well as a minimal physical resource block under the extended cyclic prefix frame structure specified in 3GPP TS 36.211.
Figure 2:
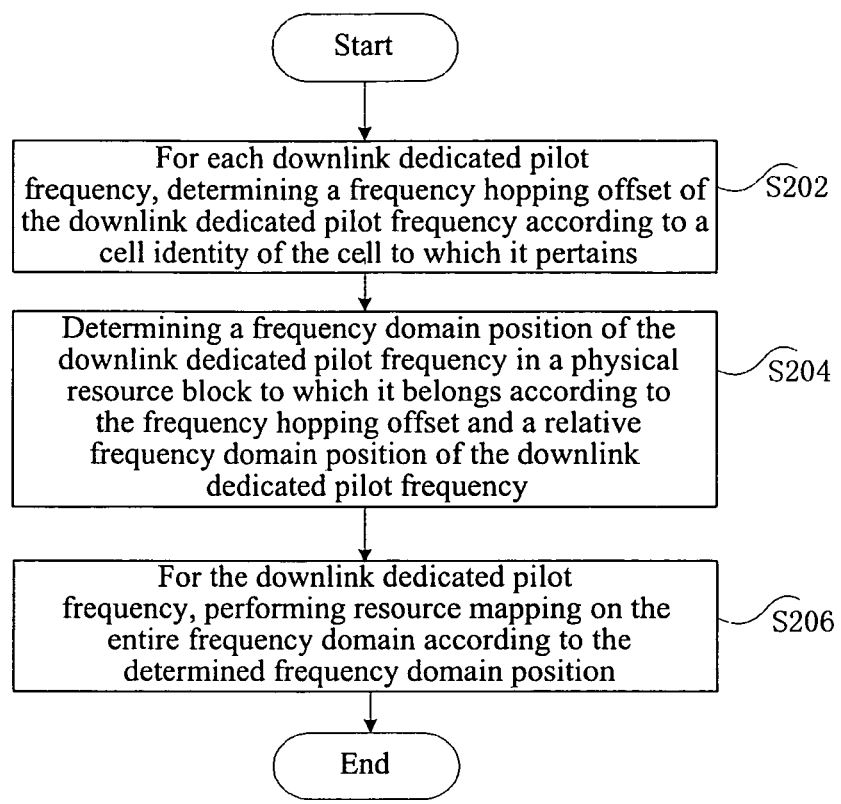
FIG. 2 is a flow chart of a method for frequency hopping of a downlink dedicated pilot frequency in accordance with an embodiment of the present invention.

The present invention provides a method for frequency hopping of a downlink dedicated pilot frequency in respect to the LTE and LTE Advanced system, and as illustrated in FIG. 2, the method comprises:

Step S202, configuring downlink dedicated pilot frequencies for terminals, and for each downlink dedicated pilot frequency, determining a frequency hopping offset $v_{shift}$ corresponding to the downlink dedicated pilot frequency according to a cell identity of the cell to which it pertains;

Step S204, according to the frequency hopping offset of the downlink dedicated pilot frequency and its relative frequency domain position in a physical resource block to which it belongs, determining a frequency domain position of the downlink dedicated pilot frequency in the physical resource block (RB) to which it belongs after a frequency hopping, and keeping the relative positions and the number of the downlink dedicated pilot frequencies in the RB unchanged.

Step 206, performing resource mapping for the downlink dedicated pilot frequency on the entire frequency domain, according to the determined frequency domain position.

The frequency hopping offset $v_{shift}$ of the downlink dedicated pilot frequency designed in the present invention is determined according to the following rules:

1. Ensure that downlink dedicated pilot frequencies of adjacent cells are not transmitted at the same position in the frequency domain.

2. Ensure that the downlink dedicated pilot frequency does not collide with a common pilot frequency;

The common pilot frequency comprises four frequencies: $R_0$, $R_1$, $R_2$, and $R_3$, wherein, $R_0$ is a common pilot frequency of antenna port 0, $R_1$ is a common pilot frequency of antenna port 1, $R_2$ is a common pilot frequency of antenna port 2, and $R_3$ is a common pilot frequency of antenna port 3.

3. Ensure that the number, the time domain interval and the frequency domain interval of the dedicated pilot frequencies in a physical resource block allocated for the UE in downlink remain unchanged before or after a frequency hopping.

Based on the above rules, in the step S202, for the extended cyclic frame structure of the LTE system, determining a frequency hopping offset $v_{shift}$ of each downlink dedicated pilot frequency according to the cell identity to which the downlink dedicated pilot frequency pertains is specifically:

$$v_{shift}=N_{ID}^{cell} \bmod 3; \text{ or } v_{shift}=(N_{ID}^{cell}+2) \bmod 3; \text{ or}$$
$$v_{shift}=(N_{ID}^{cell} \bmod 6; \text{ or } v_{shift}=(N_{ID}^{cell}+2) \bmod 6.$$

Wherein, $N_{ID}^{cell}$ is the identity (ID) of the cell where the terminal locates, mod represents modulo, $v_{shift}=N_{ID}^{cell}$ mod 3 indicates $v_{shift}$ is a remainder of division of $N_{ID}^{cell}$ by 3, $v_{shift}=N_{ID}^{cell}$ mod 6 indicates $v_{shift}$ is a remainder of division of $N_{ID}^{cell}$ by 6, $v_{shift}=(N_{ID}^{cell}+2)$mod 3 indicates $v_{shift}$ is a remainder of division of $N_{ID}^{cell}$ plus 2 by 3, and $v_{shift}=(N_{ID}^{cell}+2)$mod 6 indicates $v_{shift}$ is a remainder of division of $N_{ID}^{cell}$ plus 2 by 6.

In the step S204, if the sum of the relative frequency position of the downlink dedicated pilot frequency in the physical resource block and its frequency hopping offset is less than or equal to the number of sub-carriers included in the physical resource block, the position of the downlink dedicated pilot frequency after a frequency hopping equals its relative frequency domain position plus its frequency hopping offset. If the sum of the relative frequency domain position of the downlink dedicated pilot frequency in the physical resource block and its frequency hopping offset is greater than the number of sub-carriers included in the physical resource block, then the frequency domain position of the downlink dedicated pilot frequency after a frequency hopping is a frequency domain position obtained by the sum of its relative frequency domain position and frequency hopping offset modulo the number of sub-carriers included in the physical resource block, and in such way, the downlink dedicated pilot frequency which is out of the physical resource block after a frequency hopping will be cyclically shifted to fill the front end of the physical resource block.

In the step S206, performing resource mapping according to the determined frequency domain position is specifically: according to the determined frequency domain position, determining a frequency domain position k of the downlink dedicated pilot frequency in the entire frequency domain, and $k=(k'+v_{shift})$mod $N_{SC}^{RB}+N_{SC}^{RB} \cdot n_{PRB}$, wherein, k' represents the relative frequency domain position of the downlink dedicated pilot frequency, $n_{PRB}$ is the serial number of the physical resource block allocated for the terminal on the entire bandwidth of the physical downlink shared channel, and $N_{SC}^{RB}$ is the number of sub-carriers included in each minimal physical resource block, of which the value is 12 in the LTE standard version of 3GPP TS 36.211 v8.2.0, i.e., each physical resource block includes 12 sub-carriers.

Since IDs of cells are consecutive natural numbers, by using the remainder of division by 3 or by 6, the values of the $v_{shift}$ of adjacent cells are differentiated, i.e., the frequency offsets of the dedicated pilot frequencies are differentiated. Thereby, the frequency domain positions of downlink dedicated pilot frequencies of adjacent cells are differentiated, the interference between pilot frequencies of adjacent cells is decreased, and the channel estimation performance is improved.

The formula for frequency hopping of the common pilot frequency is $v_{shift}=N_{ID}^{cell}$ mod 6, and the frequency hopping offset of the dedicated pilot frequency is $v_{shift}$=mod 3, $v_{shift}=(N_{ID}^{cell}+2)$mod 3, $v_{shift}=N_{ID}^{cell}$ mod 6, or $v_{shift}=(N_{ID}^{cell}+2)$mod 6, all of which are remainders of divisions by 3 or 6 based on the cell ID, therefore, the common pilot frequency will never collide with the dedicated pilot frequency.

By the $k=(k'+v_{shift})$mod $N_{SC}^{RB} \cdot n_{PRB}$ described above, i.e. the relative position $(k'+v_{shift})$ of the downlink dedicated pilot frequency modulo $N_{SC}^{RB}$, the dedicated pilot frequency hopping out of each physical resource block is cyclically shifted to fill the front end of the physical resource block, so as to keep the number and density of the downlink dedicated pilot frequencies in each RB unchanged.

In the first embodiment of the present invention, the frequency domain position k of a dedicated pilot frequency after a frequency hopping is represented by the following formulas:

$$k = (k' + v_{shift}) \bmod N_{SC}^{RB} + N_{SC}^{RB} \cdot n_{PRB}$$

$$k' = \begin{cases} 3m', & \text{if } l = 4 \\ 3m'+2, & \text{if } l = 1 \end{cases}$$

$$l = \begin{cases} 4 & l' \in \{0, 2\} \\ 1 & l' = 1 \end{cases}$$

$$l' = \begin{cases} 0, & \text{if } n_s \bmod 2 = 0 \\ 1, 2, & \text{if } n_s \bmod 2 = 1 \end{cases}$$

$$m' = 0, 1, \ldots, 4N_{RB}^{PDSCH} - 1$$

Wherein, $v_{shift}=N_{ID}^{cell}$ mod 3.

In the second embodiment of the present invention, the frequency domain position k of a dedicated pilot frequency after a frequency hopping is represented by the following formulas:

$$k = (k' + v_{shift}) \bmod N_{SC}^{RB} + N_{SC}^{RB} \cdot n_{PRB}$$

$$k' = \begin{cases} 3m', & \text{if } l = 4 \\ 3m'+2, & \text{if } l = 1 \end{cases}$$

$$l = \begin{cases} 4 & l' \in \{0, 2\} \\ 1 & l' = 1 \end{cases}$$

$$l' = \begin{cases} 0, & \text{if } n_s \bmod 2 = 0 \\ 1, 2, & \text{if } n_s \bmod 2 = 1 \end{cases}$$

$$m' = 0, 1, \ldots, 4N_{RB}^{PSDCH} - 1$$

Wherein, $v_{shift}=N_{ID}^{cell}$ mod 6.

In the third embodiment of the present invention, the frequency domain position k of a dedicated pilot frequency after a frequency hopping is represented by the following formulas:

$$k = (k' + v_{shift}) \bmod N_{SC}^{RB} + N_{SC}^{RB} \cdot n_{PRB}$$

$$k' = \begin{cases} 3m', & \text{if } l = 4 \\ 3m'+2, & \text{if } l = 1 \end{cases}$$

$$l = \begin{cases} 4 & l' \in \{0, 2\} \\ 1 & l' = 1 \end{cases}$$

$$l' = \begin{cases} 0, & \text{if } n_s \bmod 2 = 0 \\ 1, 2, & \text{if } n_s \bmod 2 = 1 \end{cases}$$

$$m' = 0, 1, \ldots, 4N_{RB}^{PDSCH} - 1$$

Wherein, $v_{shift}=(N_{ID}^{cell}+2)$mod 3.

In the forth embodiment of the present invention, the frequency domain position k of a dedicated pilot frequency after a frequency hopping is represented by the following formulas:

$$k = (k' + v_{shift}) \bmod N_{SC}^{RB} + N_{SC}^{RB} \cdot n_{PRB}$$

-continued $$k' = \begin{cases} 3m', & \text{if } l = 4 \\ 3m' + 2, & \text{if } l = 1 \end{cases}$$

$$l = \begin{cases} 4 & l' \in \{0, 2\} \\ 1 & l' = 1 \end{cases}$$

$$l' = \begin{cases} 0, & \text{if } n_s \bmod 2 = 0 \\ 1, 2, & \text{if } n_s \bmod 2 = 1 \end{cases}$$

$$m' = 0, 1, \ldots, 4N_{RB}^{PDSCH} - 1$$

Wherein, $v_{shift} = (N_{ID}^{cell} + 2) \bmod 6$.

The present invention further provides a base station for implementing frequency hopping of a downlink dedicated pilot frequency, comprising:

A pilot frequency offset configuration unit, configured to determine a frequency hopping offset of a downlink dedicated pilot frequency according to a cell identity of the cell to which the downlink dedicated pilot frequency pertains; the frequency hopping offset of the downlink dedicated pilot frequency determined by the pilot frequency offset configuration unit is $v_{shift} = N N_{ID}^{cell} \bmod 3$, or $(N_{ID}^{cell} + 2) \bmod 3$, or $N_{ID}^{cell} \bmod 6$, or $(N_{ID}^{cell} + 2) \bmod 6$, wherein, $N_{ID}^{cell}$ represents the cell identity.

A frequency hopping unit, configured to determine a frequency domain position of the downlink dedicated pilot frequency in the physical resource block to which it belongs after a frequency hopping according to the frequency hopping offset and the relative frequency domain position of the downlink dedicated pilot frequency;

When the frequency hopping unit determines the frequency domain position of the downlink dedicated pilot frequency in the physical resource block to which it belongs after a frequency hopping, if the sum of the relative frequency domain position of the downlink dedicated pilot frequency in the physical resource block and its frequency hopping offset is greater than the number of sub-carriers included in the physical resource block, the frequency domain position of the downlink dedicated pilot frequency in the physical resource block to which it belongs after a frequency hopping is a frequency domain position obtained by the sum of the relative frequency domain position and the frequency hopping offset of the downlink dedicated pilot frequency modulo the number of sub-carriers included in the physical resource block.

A mapping unit, configured to perform resource mapping for the downlink dedicated pilot frequency on the entire frequency domain according to the determined frequency domain position. A position obtained by mapping the downlink dedicated pilot frequency onto the entire frequency domain by the mapping unit is $k = (k' + v_{shift}) \bmod N_{SC}^{RB} + N_{SC}^{RB} \cdot n_{PRB}$, wherein, $(k' + v_{shift}) \bmod N_{SC}^{RB}$ is the frequency domain position of the downlink dedicated pilot frequency in the physical resource block to which it belongs after a frequency hopping, $n_{PRB}$ is the serial number of the physical resource block allocated for the terminal on the entire frequency domain of the physical downlink shared channel, and $N_{SC}^{RB}$ is the number of sub-carriers included in each minimal physical resource block.

The above description is merely preferred embodiments of the present invention, but not to limit the present invention, and for those skilled in the art, the present invention may have a variety of variations and alterations. And any modifications, equivalent substitutions and improvements within the spirit and principle of the present invention shall fall into the protection scope of present invention.

Industrial Applicability

The present invention has the following beneficial effects: (1) differentiate the frequency domain positions of downlink dedicated pilot frequencies of adjacent cells, so as to decrease the interference between the dedicated pilot frequencies of the adjacent cells and improve the channel estimation performance of the dedicated pilot frequency; (2) prevent the common pilot frequency from colliding with the downlink dedicated pilot frequency and allow the downlink dedicated pilot frequency to work reliably; (3) allow both the common pilot frequency and the downlink dedicated pilot frequency to perform frequency hopping, so as to unify the coverage of control channel and data channel.

What we claim is:

1. A method for frequency hopping of a downlink dedicated pilot frequency, comprising:

for the downlink dedicated pilot frequency, determining a frequency hopping offset corresponding to the downlink dedicated pilot frequency according to a cell identity of a cell to which the downlink dedicated pilot frequency pertains;

determining a frequency domain position of the downlink dedicated pilot frequency in a physical resource block to which the downlink dedicated pilot frequency belongs after a frequency hopping according to the frequency hopping offset and a relative frequency domain position of the downlink dedicated pilot frequency;

performing resource mapping for the downlink dedicated pilot frequency on the entire frequency domain according to the determined frequency domain position;

wherein, if a sum of the relative frequency domain position of the downlink dedicated pilot frequency in the physical resource block and the frequency hopping offset of the downlink dedicated pilot frequency is greater than the number of sub-carriers included in the physical resource block, the frequency domain position of the downlink dedicated pilot frequency in the physical resource block to which the downlink dedicated pilot frequency belongs after a frequency hopping is a frequency domain position obtained by the sum of the relative frequency domain position and the frequency hopping offset of the downlink dedicated pilot frequency modulo the number of sub-carriers included in the physical resource block.

2. The method of claim 1, wherein, a position of the downlink dedicated pilot frequency mapped onto the entire frequency domain is $k = (k' + v_{shift}) \bmod N_{SC}^{RB} + N_{SC}^{RB} \cdot n_{PRB}$, wherein $(k' + v_{shift}) \bmod N_{SC}^{RB}$ is the frequency domain position of the downlink dedicated pilot frequency in the physical resource block to which the downlink dedicated pilot frequency belongs after a frequency hopping, $n_{PRB}$ is a serial number of the physical resource block allocated for a terminal on the entire frequency domain of a physical downlink shared channel, and $N_{SC}^{RB}$ is the number of sub-carriers included in each minimal physical resource block.

3. The method of claim 1, wherein, the frequency hopping offset corresponding to the downlink dedicated pilot frequency determined according to the cell identity to which the downlink dedicated pilot frequency pertains is a frequency hopping offset $v_{shift}$ of the downlink dedicated pilot frequency, and $v_{shift} = N_{ID}^{cell} \bmod 3$, wherein $N_{ID}^{cell}$ represents the cell identity.

4. The method of claim 1, wherein, the frequency hopping offset of the downlink dedicated pilot frequency is $v_{shift} = (N_{ID}^{cell} + 2) \bmod 3$, wherein $N_{ID}^{cell}$ represents the cell identity.

5. The method of claim 1, wherein, the frequency hopping offset of the downlink dedicated pilot frequency is $v_{shift}=N_{ID}^{cell}$ mod 6, wherein, $N_{ID}^{cell}$ represents the cell identity.

6. The method of claim 1, wherein, the frequency hopping offset of the downlink dedicated pilot frequency is $v_{shift}=(N_{ID}^{cell}+2)$mod 6 wherein, $N_{ID}^{cell}$ represents the cell identity.

7. The method of claim 1, wherein, the frequency hopping offset corresponding to the downlink dedicated pilot frequency determined according to the cell identity to which the downlink dedicated pilot frequency pertains is a frequency hopping offset $v_{shift}$ of the downlink dedicated pilot frequency, and $v_{shift}=N_{ID}^{cell}$ mod 3, wherein, $N_{ID}^{cell}$ represents the cell identity.

8. The method of claim 2, wherein, the frequency hopping offset corresponding to the downlink dedicated pilot frequency determined according to the cell identity to which the downlink dedicated pilot frequency pertains is a frequency hopping offset $v_{shift}$ of the downlink dedicated pilot frequency, and $v_{shift}=N_{ID}^{cell}$ mod 3, wherein, $N_{ID}^{cell}$ represents the cell identity.

9. The method of claim 1, wherein, the frequency hopping offset of the downlink dedicated pilot frequency is $v_{shift}=(N_{ID}^{cell}+2)$mod 3, wherein, $N_{ID}^{cell}$ represents the cell identity.

10. The method of claim 2, wherein, the frequency hopping offset of the downlink dedicated pilot frequency is $v_{shift}=(N_{ID}^{cell}+2)$mod 3, wherein, $N_{ID}^{cell}$ represents the cell identity.

11. The method of claim 1, wherein, the frequency hopping offset of the downlink dedicated pilot frequency is $v_{shift}=N_{ID}^{cell}$ mod 6, wherein, $N_{ID}^{cell}$ represents the cell identity.

12. The method of claim 2, wherein, the frequency hopping offset of the downlink dedicated pilot frequency is $v_{shift}=N_{ID}^{cell}$ mod 6, wherein, $N_{ID}^{cell}$ represents the cell identity.

13. A base station for implementing frequency hopping of a downlink dedicated pilot frequency, comprising:
 a pilot frequency offset configuration unit, configured to determine a frequency hopping offset corresponding to the downlink dedicated pilot frequency according to a cell identity of a cell to which the downlink dedicated pilot frequency pertains;
 a frequency hopping unit, configured to determine a frequency domain position of the downlink dedicated pilot frequency in a physical resource block to which the downlink dedicated pilot frequency belongs after a frequency hopping according to the frequency hopping offset and a relative frequency domain position of the downlink dedicated pilot frequency;
 a mapping unit, configured to perform resource mapping for the downlink dedicated pilot frequency on the entire frequency domain according to the determined frequency domain position;
 wherein, when the frequency hopping unit determines the frequency domain position of the downlink dedicated pilot frequency in the physical resource block to which the downlink dedicated pilot frequency belongs after a frequency hopping, if a sum of the relative frequency domain position of the downlink dedicated pilot frequency in the physical resource block and the frequency hopping offset of the downlink dedicated pilot frequency is greater than the number of sub-carriers included in the physical resource block, the frequency domain position of the downlink dedicated pilot frequency in the physical resource block to which the downlink dedicated pilot frequency belongs after a frequency hopping is a frequency domain position obtained by the sum of the relative frequency domain position and the frequency hopping offset of the downlink dedicated pilot frequency modulo the number of sub-carriers included in the physical resource block.

14. The base station of claim 13, wherein, a position of the downlink dedicated pilot frequency mapped onto the entire frequency domain by the mapping unit is $k=(k'+v_{shift})$mod $N_{SC}^{RB}+N_{SC}^{RB} \cdot n_{PRB}$, wherein, $(k'+v_{shift})$mod $N_{SC}^{RB}$ is the frequency domain position of the downlink dedicated pilot frequency in the physical resource block to which the downlink dedicated pilot frequency belongs after a frequency hopping, $n_{PRB}$ is a serial number of the physical resource block allocated for a terminal on the entire frequency domain of a physical downlink shared channel, and $N_{SC}^{RB}$ is the number of sub-carriers included in each minimal physical resource block.

15. The base station of claim 13, wherein, the frequency hopping offset of the downlink dedicated pilot frequency determined by the pilot frequency offset configuration unit is $v_{shift}=N_{ID}^{cell}$ mod 3, or $(N_{ID}^{cell}+2)$mod 3, or $N_{ID}^{cell}$ mod 6, or $(N_{ID}^{cell}+2)$mod 6, wherein, $N_{ID}^{cell}$ represents the cell identity.

16. The base station of claim 13, wherein, the frequency hopping offset of the downlink dedicated pilot frequency determined by the pilot frequency offset configuration unit is $v_{shift}=N_{ID}^{cell}$ mod 3, or $(N_{ID}^{cell}+2)$mod 3, or $N_{ID}^{cell}$ mod 6, or $(N_{ID}^{cell}+2)$mod 6, wherein, $N_{ID}^{cell}$ represents the cell identity.

17. The base station of claim 14, wherein, the frequency hopping offset of the downlink dedicated pilot frequency determined by the pilot frequency offset configuration unit is $v_{shift}=N_{ID}^{cell}$ mod 3, or $(N_{ID}^{cell}+2)$mod 3, or $N_{ID}^{cell}$ mod 6, or $(N_{ID}^{cell}+2)$mod 6, wherein, $N_{ID}^{cell}$ represents the cell identity.

* * * * *